(12) United States Patent
Graves et al.

(10) Patent No.: US 6,198,558 B1
(45) Date of Patent: Mar. 6, 2001

(54) ARCHITECTURE REPARTITIONING TO SIMPLIFY OUTSIDE-PLANT COMPONENT OF FIBER-BASED ACCESS SYSTEM

(75) Inventors: Alan Frank Graves; Todd Douglas Morris, both of Kanata; Donald Russell Ellis, Ottawa, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/056,096

(22) Filed: Apr. 7, 1998

(51) Int. Cl.[7] ....................................................... H04J 14/08
(52) U.S. Cl. ........................... 359/137; 359/125; 359/152; 359/167; 359/185; 359/119; 370/395; 370/418; 370/907; 370/403; 370/460; 370/389
(58) Field of Search ................................... 359/125, 137, 359/167, 152, 119, 185; 370/389, 398, 452, 458, 460, 403, 521, 907; 348/6–7, 10, 12, 13; 455/5.1

(56) References Cited

U.S. PATENT DOCUMENTS

| | | | |
|---|---|---|---|
| 5,666,487 | * 9/1997 | Goodman et al. | 370/395 |
| 5,793,410 | * 8/1998 | Rao | 348/7 |
| 5,864,415 | * 1/1999 | Williams et al. | 359/125 |
| 6,041,056 | * 3/2000 | Bigham et al. | 370/395 |

* cited by examiner

*Primary Examiner*—Kinfe-Michael Negash

(57) ABSTRACT

An improved access system for use in a Fiber-In-The-Loop (FITL) communications network is disclosed. The access system comprises a host digital terminal (HDT) and a plurality of subtending optical network units (ONUs). The digital signal processing (DSP) functions traditionally executed by line interface units (LIUs) within the ONUs are migrated to the HDT, rendering the individual ONUs simpler, cheaper and more reliable. This is made possible by the provision in each ONU of an oversampling codec for sampling (and conversion) of upstream and downstream data at a very high bit rate. The large bandwidths of the data communicated between the ONUs and the HDT are easily handled by the fiber optic medium therebetween. In the HDT, DSP functions are executed by a common pool, or bank, of DSP ASICs. Decimators are provided in the HDT in order to properly format the data for processing by the DSPs. Interpolators are provided in the HDT for creating a high rate bit stream that can be easily converted to analog format by a codec. A high degree of processing efficiency can be achieved by reducing complex processing tasks to a sequence of individual steps through the DSP bank and rerouting the result of each step through the bank. Such "hair pinning" can be performed in either the upstream (subscriber-to-core-network) or downstream (core-network-to-subscriber) directions. Optionally, decimators and interpolators can be provided in the LIUs.

57 Claims, 11 Drawing Sheets

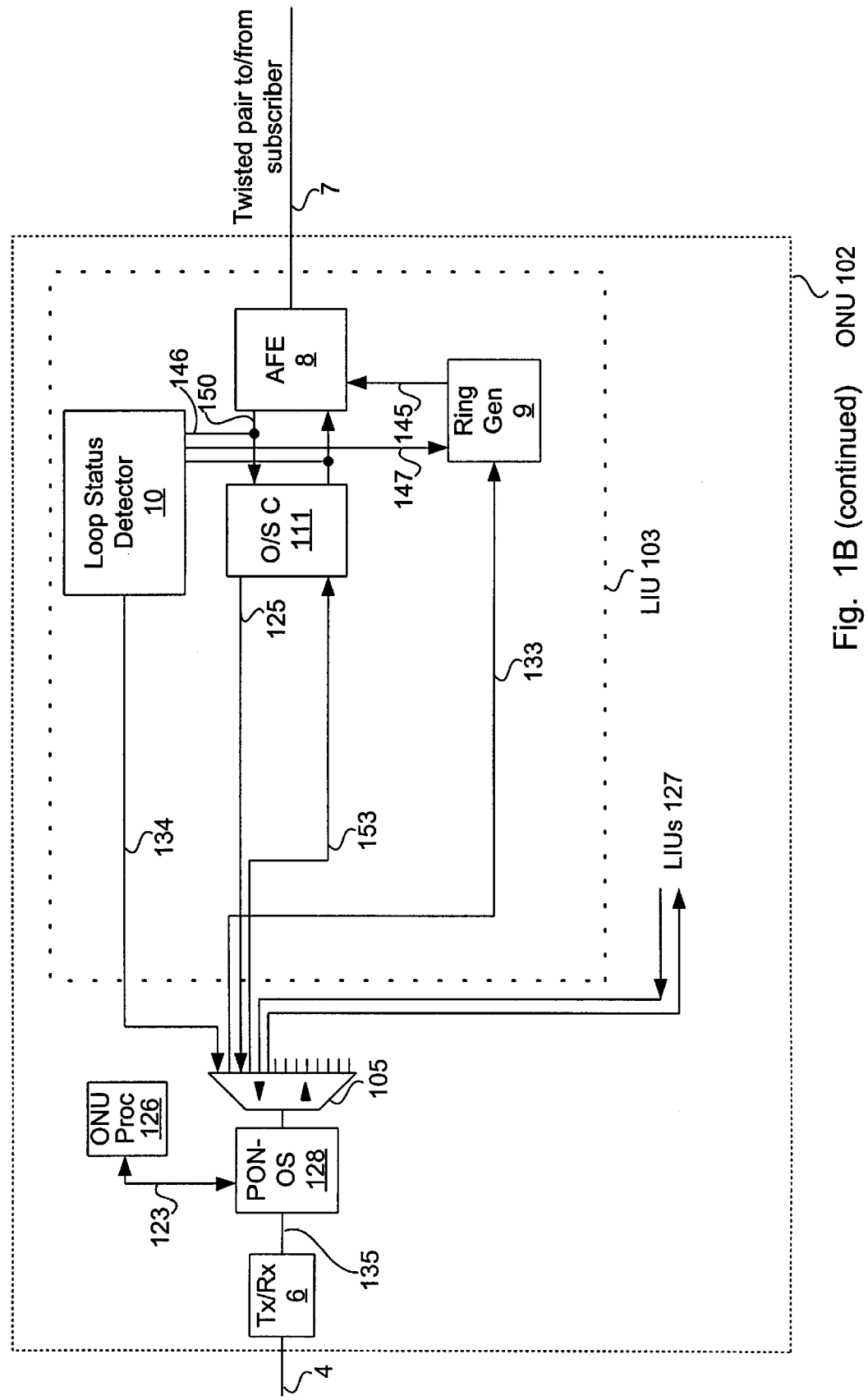
Fig. 1B (continued)  ONU 102

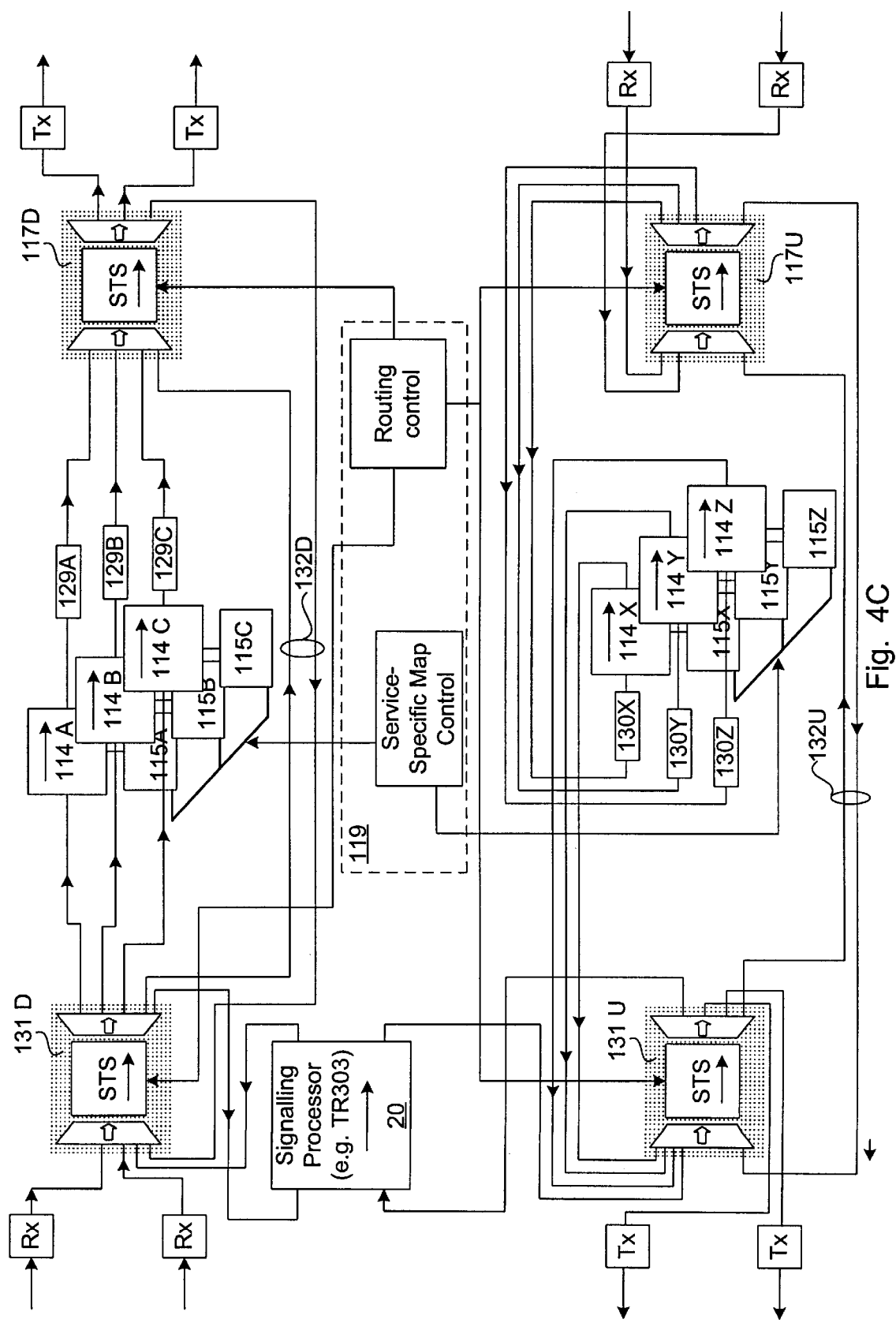

ARCHITECTURE REPARTITIONING TO SIMPLIFY OUTSIDE-PLANT COMPONENT OF FIBER-BASED ACCESS SYSTEM

FIELD OF THE INVENTION

The present invention is directed to communication network access architectures and particularly relates to reducing the complexity of Optical Network Units (ONUs) in a Fiber-In-The-Loop (FITL) architecture by repartitioning some of the functionality to other elements of the network.

BACKGROUND OF THE INVENTION

In order to provide a communications network with the capability to accommodate current and future high bandwidth (broadband) services, optical fiber is being extended deeper into the network, towards the end user. The final link to homes or businesses in present-day systems is often still part of the installed distribution infrastructure, comprised mainly of twisted pairs of copper wire arranged in a topology of distribution cables and drop lines. For high-bandwidth applications, signal loss along a twisted pair increases with frequency and so the length of the twisted pairs must be kept small, leading to deeper penetration of the fiber.

In fact, it is known that the loss in decibels is nonlinearly related to the frequency of measurement (raised to the power 0.5 to 0.7, depending on the frequency and the type of cable) and hence a cable with a loss of, for example, 20 dB at 1 MHZ would have a loss of at least 28 dB at 2 MHZ, and at least 40 dB at 4 MHZ. Moreover, the signal loss in a twisted pair is also proportional to its length. It has been found that if the twisted pair is intercepted at a distance close enough to the end user so that high bit rates (on the order of 25 Megabits per second (Mbps)) can be successfully delivered, then, depending upon the complexity of the loop transmission equipment, the loop must be shortened so as to have a length of at most approximately 500 to 3,000 feet.

This upper bound on loop length has led to the development of new access architectures, known in the art as Fiber-To-The-Cabinet (FTTCab), Fiber-To-The-Neighbourhood (FTTN), Fiber-To-The-Curb (FTTC) or Fiber-To-The-Building (FTTB), all generically referred to as Fiber-In-The-Loop (FITL). The FTTC architecture has been the method of choice when considering the delivery of broadband services to a residential area consisting of single-family dwellings.

Traditional FITL implementations provide a system in which a Host Digital Terminal (HDT) controls the FITL network and is located at, say, a central office. The HDT is connected on one side to core network resources and on another side (the "access side") to a series of dependent Optical Network Units (ONUs) via a fiber-based link in the form of a Passive Optical Network (PON), a Synchronous Optical Network (SONET) ring or a number of point-to-point links. Finally, the ONUs communicate bidirectional data with the individual end users along the final (short) stretches of copper.

At such short maximum loop lengths of only a few hundred feet, the number of subscribers that can be served by a single ONU is rather limited. Therefore, the ONU must be small, simple and inexpensive for the service provider to buy and install so that its initial cost can be borne by the revenues from the small number of subscribers that the ONU serves. Furthermore, having only a small group of subscribers served by any one ONU requires that a very large number of ONUs be deployed to create a ubiquitous access network. This demands that the ONUs, once installed, be individually very cheap to maintain while allowing for future changes in subscriber service requirements. Since the ONUs are placed deep in the "outside plant", any requirement which causes these ONUs to be visited, either for repair purposes or for provisioning different subscriber services (by changing line card functionality), will result in a system that is too costly to operate.

Conventional prior art FITL architectures, FTTC in particular, have adopted the approach of installing shelves or frames of equipment, including service-specific line cards, in a protective housing on the curbside. Such ONUs are large, complex and require regular visits, in order both to modify services by changing line card types and to repair the units, since more complex ONUs are more likely to fail. Hence, the cost of deploying an array of service-specific line cards is prohibitively high in terms of capital cost (complex electronics, large cabinets) and also in terms of operating costs due to the need to visit the ONU so as to implement a service type change by replacing the line card type. Furthermore, installing cabinet-mounted equipment is often complicated by the unavailability of acceptable locations in residential areas. This becomes more critical as the loop length is shortened and ONU size is reduced to the point where ONUs are installed within subdivisions and not at their edges.

An alternative prior art approach consists of replacing the service-specific line cards with (somewhat more expensive) service-independent line cards that can be configured in software. These are primarily based upon the use of wideband analog front-end loop drivers, oversampling codecs, bit-rate-reduction (decimator) blocks and digital filtering components, also known as Digital Signal Processor Application-Specific Integrated Circuits (DSP ASICs). This combination of functions allows the service-specific functions of the line card to be implemented in software, which can be downloaded to the ONU from the HDT, thereby eliminating the need to visit the ONU to change the service type delivered to a subscriber.

This solution, also referred to as Service-Adaptive Access (SAA), has been adopted by Nortel in the development of its S/DMS Access Node, which can be deployed in a FTTC or FTTCab configuration. The ONU, also called an RDT (Remote Digital Terminal), consists of an array of service-dependent line cards, or alternatively service-independent line cards based upon on-card DSP processing and each using a DSP dedicated to that card, or possibly (in order to control cost) a mix of both types of line cards, in addition to common equipment for multiplexing the digitized signals, a control processor and an optoelectronic transceiver. The number of different line card types can be reduced by replacing some or all of the standard POTS (Plain Old Telephone Service) cards with SAA line cards.

When data flows from the subscriber into the ONU, (known as the "upstream" path), the S/DMS Access Node samples the input analog signal arriving on the twisted pair and puts it into a standard digital format prior to transmission from the ONU to the HDT. In the opposite ("downstream") direction, the ONU converts, for example, $\mu$-law-encoded digital voice data into an analog format for delivery to a user's home. Unfortunately, the deployment of such ONUs, each comprising a set of service-independent line cards, has several serious drawbacks in the context of a FITL system with deep fiber penetration:

1) Cost

The DSP-based line card has a larger power consumption, complexity and failure rate, which translates into significantly higher system cost;

2) Size

The size of the ONUs has increased, making it more difficult to install them in locations close to the end user;

3) Complex software download

The ONU and access system at the HDT have to provide a high-integrity software download/verification path which requires a processor in each ONU for monitoring download integrity;

4) Initial servicing

The functionality of the individual line cards is such that the ONU must be visited each time a new subscriber is to be accommodated. The SAA cards do not allow "future-proofing", i.e. it is not possible to connect every loop to a line card (regardless of whether or not that loop was expected to go into service immediately) and then to remotely provision, or "initialize", that loop;

5) Efficiency

The DSP is placed on the line card and as such is dedicated to a single loop. Furthermore, it has to be dimensioned for the most stringent expected processing demands that can be encountered in the loop. In combination, this leads to the number of high-performance DSPs deployed being equal to the number of lines served. Thus for many service types, including low-bandwidth POTS (the most common), each DSP may be operating at a fraction of its full capacity. However, this spare capacity cannot be shared across other loops, leading to an effective increase in power consumption and total system cost.

It is important to note that reducing the size of the ONU by reducing the number of DSP-based SAA line cards per ONU does little in the way of mitigating the above disadvantages. In fact, partitioning the equipment into smaller ONUs with lower line counts per ONU results in an increased overall complexity since the simplification achieved on a per-ONU basis is more than offset by the increased number of ONUs that have to be deployed. As the ONU line count falls, the overall complexity of the ONU population required to serve a particular area or group of subscribers rises and has deleterious consequences on the mean-time-between-failures (MTBF) of the ONU population, requiring a higher degree of maintenance activity. This translates into more frequent on-site visits ("truck rolls") by the repair crew and requires more travelling to the increased number of ONU sites.

SUMMARY OF THE INVENTION

It is an object of the present invention to obviate or mitigate one or more disadvantages of the prior art.

In a fiber optic communication system comprising a host digital terminal (HDT) for connection to a core communications network and connected by optical fiber to at least one optical network unit (ONU) for interfacing to a plurality of different subscriber loops, wherein digital data travelling from the core network to one of the plurality of subscriber loops undergoes a change of format from one of a plurality of first data formats to one of a plurality of second data formats, and wherein digital data travelling from each of the plurality of subscriber loops to the core network undergoes a change of format from one of the plurality of second data formats to one of the plurality of first data formats, the invention may be summarized according to a first broad aspect as the improvement wherein signal processing functions for converting the digital data from any first data format to any second data format and vice versa are executed in the HDT.

In a system for accessing a core communications network, the system comprising a host digital terminal (HDT) for connection to the core network and connected by optical fiber to at least one optical network unit (ONU) interfacing to a plurality of subscriber loops, wherein the HDT comprises a digital switch matrix and a plurality of programmable digital signal processors (DSPs) connected to the digital switch matrix, and executing respective processing functions, the invention may be summarized according to a second broad aspect as a method of communicating data between the HDT and the at least one ONU, comprising: in a downstream direction, the switch matrix routing data received from the core network to selective ones of the DSPs; the DSPs performing respective processing functions, yielding downstream processed data; the switch matrix routing the downstream processed data to the at least one ONU; and in an upstream direction, the switch matrix routing data received from the at least one ONU to selective ones of the DSPs; the DSPs performing respective processing functions, yielding upstream processed data; the switch matrix routing the upstream processed data to the core network.

According to a third broad aspect, the invention may be summarized as a host digital terminal (HDT) for enabling bidirectional communication between a core network and at least one optical network unit (ONU) having a plurality of line interface units (LIUs), the HDT comprising a digital switch matrix, a plurality of programmable digital signal processors (DSPs) connected to the digital switch matrix for executing the signal processing functions; at least on first optical transceiver connected between the optical fiber and the switch matrix; at least one second optical transceiver for connection to the core network and connected to the switch matrix; and means to control the digital switch matrix so as to select, for each LIU, at least one first signal processing function to be executed by a first subset of the plurality of DSPs on data arriving from the core network through the at least one second optical transceiver and destined for the LIU, and at least one second signal processing function to be executed by a second subset of the plurality of DSPs on data arriving from the LIU through the at least one first optical transceiver and destined for the core network.

The invention may be summarized according to another broad aspect as an optical network unit (ONU) for enabling communication between a plurality of subscriber loops and a host digital terminal (HDT), comprising a plurality of substantially identical line interface units (LIUs) for respectively interfacing to the plurality of subscriber loops and each having an oversampling codec; an optical transceiver for connection to the optical fiber; and a bidirectional multiplexer connected between the optical transceiver and the plurality of LIUs.

BRIEF DESCRIPTION OF THE DRAWINGS

The present invention will be described with reference to the following drawings, in which:

FIGS. 4A, 4B and 4C are detailed block diagrams illustrating three different embodiments of part of the HDT of FIG. 1B in accordance with the present invention.

DETAILED DESCRIPTION OF THE PREFERRED EMBODIMENT

Before the invention is described in detail the structure and function of the conventional prior art system of FIG. 1A will be described.

Figure 1A:
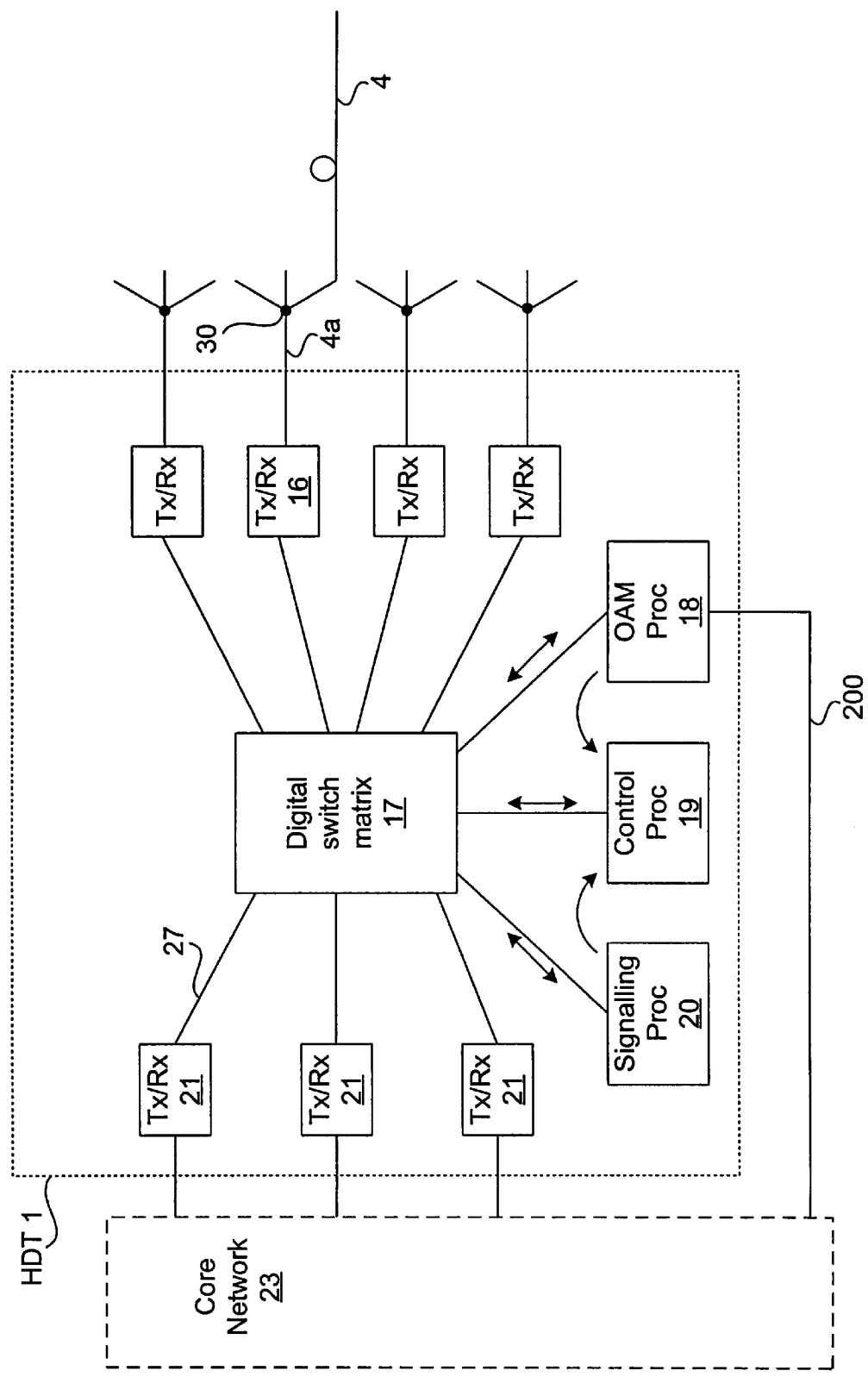
FIG. 1A is a block diagram illustrating a prior art FITL communications network.
Figure 1A:
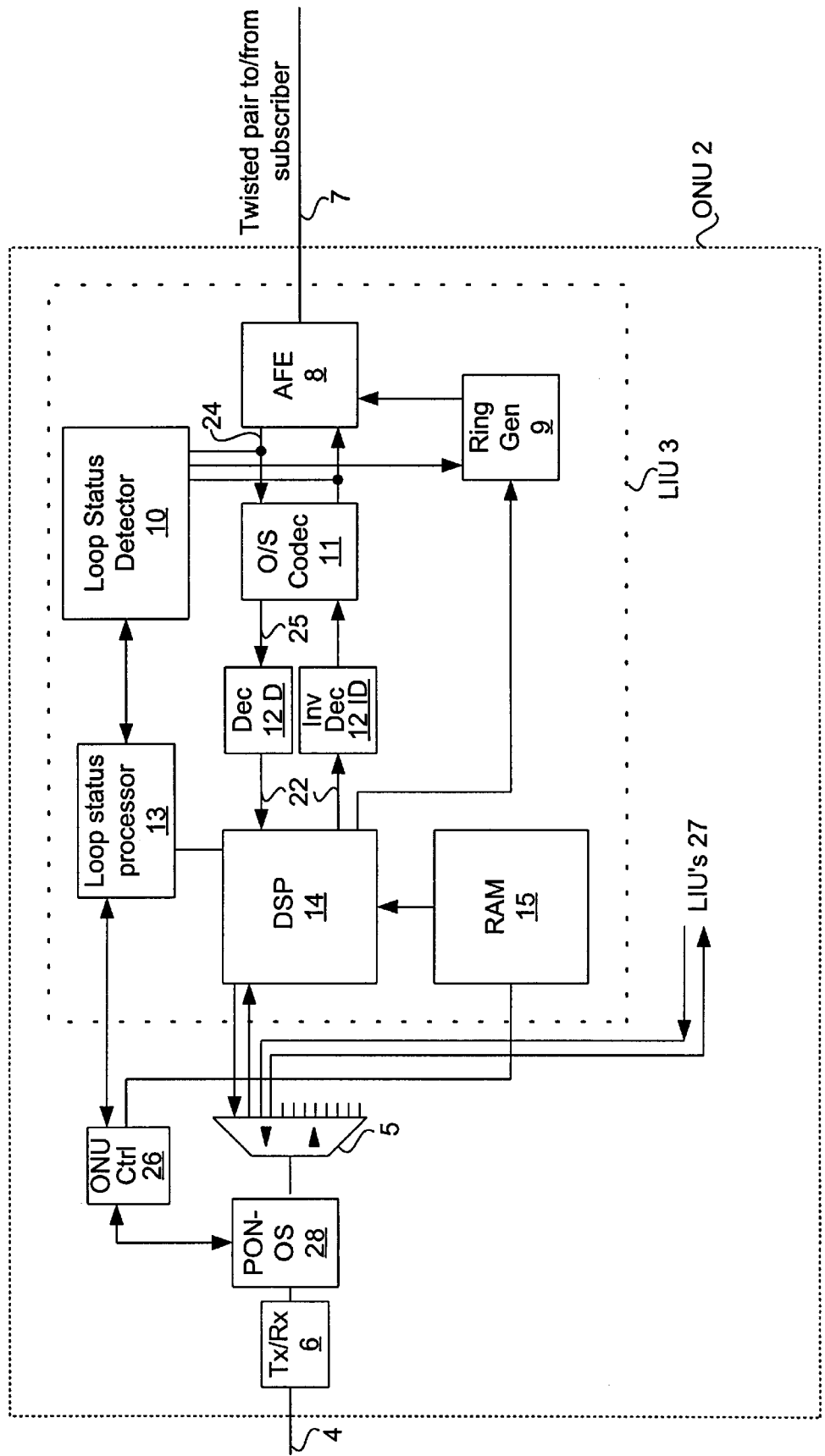

With reference to FIG. 1A, a fiber-based access system intended to provide FTTCab, FTTC or FTTB as part of a communications network consists of two main types of components, an HDT 1 and a plurality of ONUs 2 (only one of which is shown). Each ONU 2 has a plurality of Line Interface Units (LIUs) 3,27 connected to a bidirectional optical fiber distribution cable 4 via an intervening mux (multiplexer-demultiplexer) 5, a PON out station (PON-OS) 28, and an optical transceiver 6.

A number of different ONUs in the same vicinity are grouped together by virtue of their associated distribution cables being joined together at a passive optical splitter 30 which is connected directly by means of an optical fiber umbilical 4a to a transceiver 16 of the HDT 1. There may be a plurality of groups of ONUs, each group being connected to the HDT through a respective optical fiber umbilical and transceiver. Prior art configurations for the fiber link between the HDT and the multiple ONUs include the PON configuration shown in FIG. 1A, a point-to-point connection between the HDT and each ONU, as well as ring configurations with an optical transport ring passing from the HDT through each of the ONUs in turn and returning to the HDT.

The HDT 1 further comprises a digital switch matrix 17 connected to the transceivers 16, in addition to an operations, administration and maintenance (OAM) processor 18, a control processor 19 and a signalling processor 20, each of which are also connected to the digital switch matrix 17. The OAM processor 18 includes a communication port 200 by which it can receive control, provisioning and configuration instructions from the management layer of the core network 23 as well as return the access system operational and maintenance status to the network management system. Finally, a plurality of transceiver blocks 21 are connected between the switch matrix 17 and the core network 23.

Turning now to the structure of the ONU, each LIU 3 is connected on one side by a bidirectional signal path 23 to the mux 5 and on the other side to a respective subscriber loop 7 which is commonly a copper twisted pair. The LIU 3 performs the function of bidirectional communication of signals with the subscriber equipment in the appropriate analog format (e.g., 4 kHz voice for POTS, 2B1Q line coded signals for ISDN—Integrated Service Digital Network) over the intervening twisted pair 7; the insertion of suitable loop currents by an Analog Front End (AFE) 8; and the superimposition of a ringing signal when required (and its rapid removal when the line conditions change to those of an "off-hook" phone) via a ringing generator 9. The LIU 3 includes a loop status detector 10 to detect when the phone or other service is activated (this may include detecting modem tones or changes in d.c. (direct current) or a.c. (alternating current) conditions on the loop 7.

The LIU 3 usually includes a wideband digital one-bit delta-sigma oversampling codec 11 able to provide adequate bandwidth and quantizing noise performance when converting signals between the analog and digital domains, a decimator 12D which removes some of the excess upstream bandwidth from the oversampling codec 11, and an inverse decimator (or "interpolator") 12ID for converting downstream words into a high-rate bit stream. The multi-bit words are fed into (read from) a service-specific processor 14 implemented as a digital signal processing (DSP) engine which converts the upstream (downstream) oversampled and decimated data on the subscriber side 22 of the DSP 14 to (from) a standard format data stream on the core network side 23 of the DSP 14. For instance, data arriving from the subscriber may be converted, in stages, from a 4 kHz analog POTS signal on the loop 7 into an analog voice waveform (free of d.c. loop signalling) at the output 24 of the AFE 8, then into a 1 Mbps one-bit delta-sigma encoded bit stream at the output 25 of codec 11, subsequently into 32 kHz×20 bits/word linearly encoded samples at the output 22 of the decimator, and finally into an 8-bit $\mu$-law pulse code modulation (PCM) signal at the output 23 of DSP 14.

Typically, a service-specific Service Application Software (SAS) is downloaded from the HDT 1 under instructions from an OAM manager via the OAM processor 18 located in the HDT 1, and stored in a service-specific SAS Random Access Memory (RAM) 15 associated with the DSP 14. Each LIU 3 interfaces with one physical path to one subscriber, such that if a subscriber has two twisted pair drops to the subscriber's premises, then two LIUs, and hence two DSPs, are required.

As an alternative to the oversampling codec, decimator, service-specific processor and SAS downloaded to the SAS RAM 15, a simple, fixed functional block such as a $\mu$-law (or A-law) PCM codec or an ISDN 2B1Q line driver/receiver and formatting block can be used. In these cases the LIU 3 would take on a fixed function and it would be necessary to visit the remote site of the ONU to physically change the LIU type in order to change the services delivered. This is both costly and time-consuming because the LIU is usually located in a small cabinet in an outside-plant location, and technical staff have to find the location of the ONU and drive to it before they can physically change the appropriate LIU.

An ONU 2 is implemented by assembly of an array of LIUs 3 in a card cage (or its equivalent) along with additional circuit packs for common equipment such as the mux 5, the PON-OS 28, the optical transceiver 6 and an ONU control processor 26 which receives and transmits ONU control commands from and to the HDT 1. The Loop Status Detector 10 and Loop Status Processor 13 of the LIU 3 communicate loop-specific status and processing commands from the ONU control processor 26 to the ringing generator 9. Not shown is a control link from the ONU control processor to the codec 11 for controlling its output and sampling rates.

The mux 5 may be implemented using time slots or packets. For this discussion, time division multiplexed (TDM) time slots will be assumed. The mux 5 has to accommodate differing final processed bandwidths on its signal paths 23 from each of the LIUs 3 and hence has to be programmable in bandwidth per port on its access (subscriber) side. For instance, a POTS circuit would occupy 64 kbps and hence would require one 8-bit word (time slot) every 125 $\mu$s (the standard frame period for TDM) for the information path. On the other hand, an ISDN circuit runs at 144 kbps, thus requiring three 8-bit time slots every 125 $\mu$s.

In addition, a form of signalling and control path between the HDT and ONU is required. This can be achieved in one of many known forms, such as common channel signalling with multiplexed signalling messages from all line cards flowing in a single signalling channel, channel associated signalling or even embedded tone signalling or bit-robbing.

The fiber optic links 4, 4a support a bidirectional transmission path over one or two fibers. Either two fibers with unidirectional operation of each fiber could be used, or alternatively optical signals could be propagated in both directions down a single fiber with optical carriers being of a different wavelength in each direction.

Figure 2A:
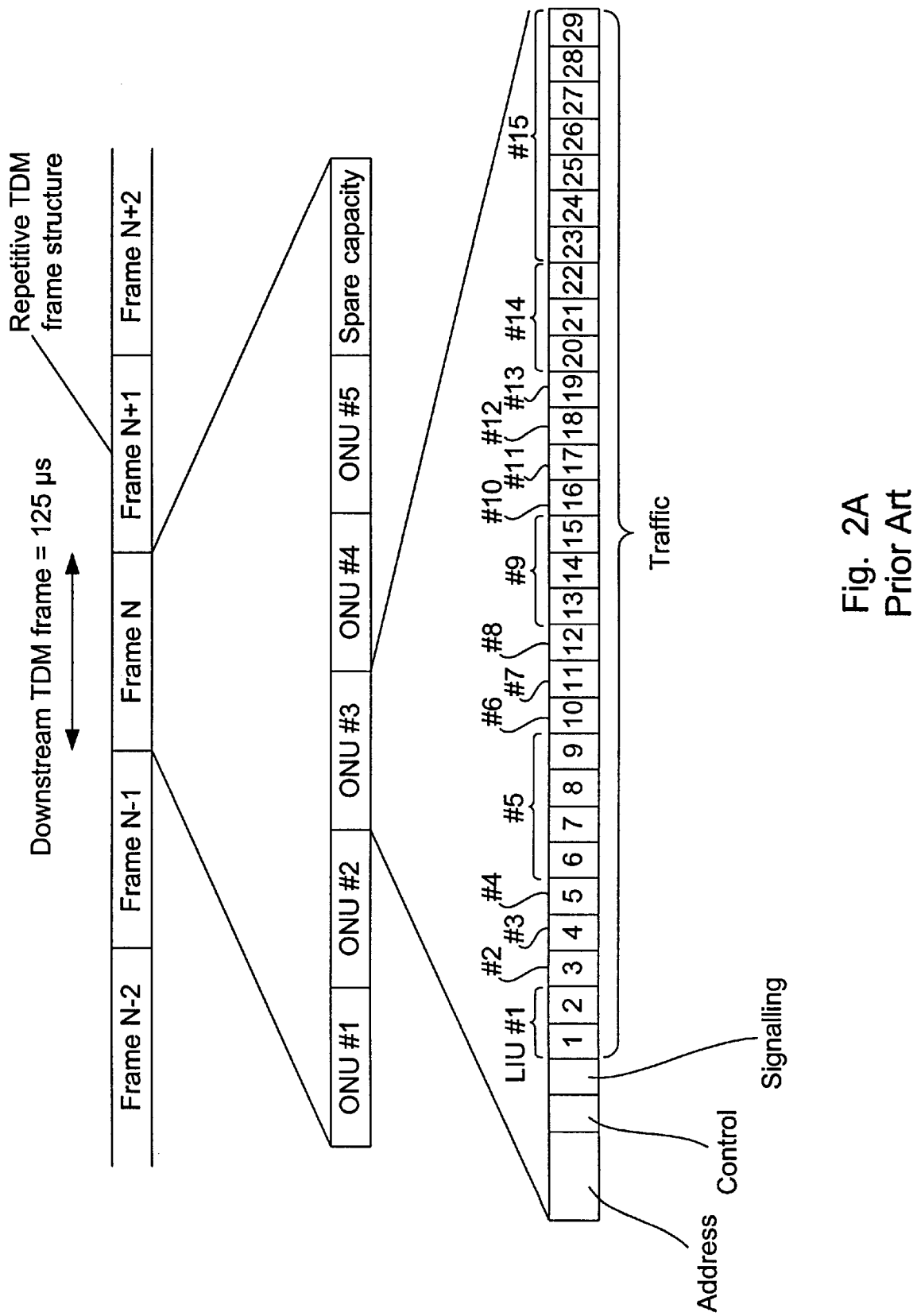
FIG. 2A shows an exemplary data structure on the downstream fiber link of the prior art network of FIG. 1A.

In the direction from the HDT 1 to the ONU 2, the basic partitioning of the transmitted bandwidth from the HDT to each ONU is carried out by known means such as assembling the traffic information into a subframe of packets, cells or sequences of time slots. The subframe can also comprise control information as well as the ONU address. An example of a prior art format at the input to ONU 2 is shown in FIG. 2A. Each 125 μs frame N sent down the umbilical 4A comprises a plurality of subframes, each of which is addressed to a specific ONU. The subframe for ONU #3 consists of an ONU address synchronisation field, a control field, a common channel multiplexed signalling field and a traffic field comprising T eight-bit time slots for the transmission of data.

The traffic, signalling and control fields, are multiplexed in one of many well known ways. One method is to allocate several time slots to the address field, then the first of two timeslots after the address field to a signalling channel and the other to a control channel. The signalling channel carries loop status information and instructions to and from a specific line card interface in a multiplexed format (e.g. Common Channel Signalling or Multiplexed Channel-Associated Signalling). The control channel carries ONU control information including SAS downloads as well as OAM status information.

The remainder of the payload time slots are used for multiplexed traffic data, which is in one or more 64 kb/s, 8-bit bytes (assuming a conventional 125 μs frame rate). Each service payload is in its final format as required at the access/core network interface. In the illustrated example, POTS occupies 1 time slot, ISDN takes up 3 time slots and DS-1 occupies 25 timeslots, while the total number of traffic time slots is T=29. The demarcation boundaries between each subframe can be changed as long as the sum of the lengths of all packets, cells or sequences of timeslots does not exceed the frame length.

Figure 2B:
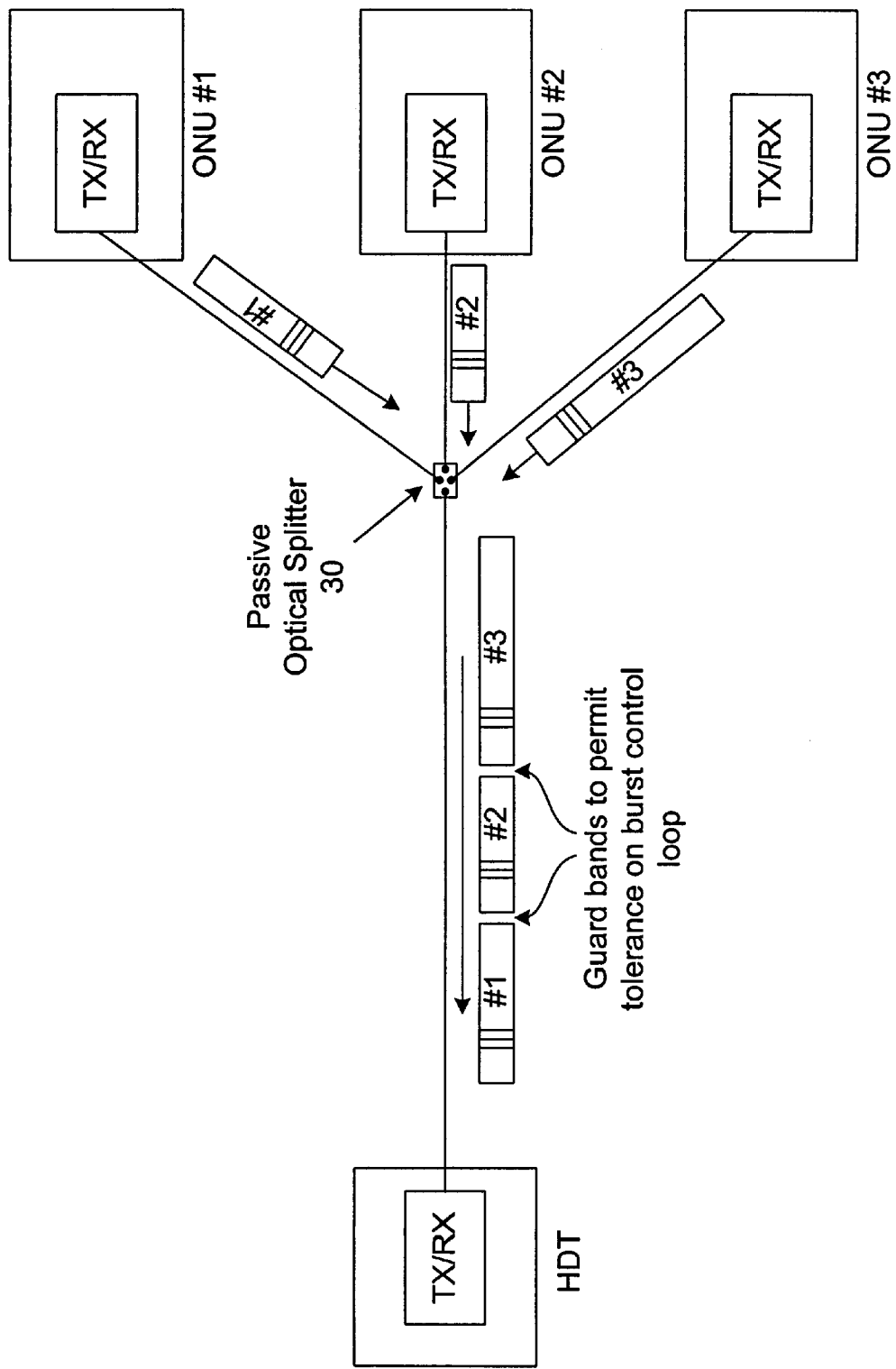
FIG. 2B illustrates upstream data flow on the fiber link of the prior art network of FIG. 1A.

In the direction from the ONU 2 to the HDT 1, each ONU transmits a burst of data, timed so that, when combined by the splitter 30, the bursts of data from all the ONUs form a train of incoming bursts at the HDT end as shown in FIG. 2B. The transmission protocol operates in TDM mode with HDT synchronization of ONU burst timing to avoid burst collision, which would otherwise result in one ONU overwriting another ONU's data in the upstream path. In this way, transmission path delay from each ONU can be measured. Pairs of upstream bursts on the umbilical are separated by "guard bands" to allow tolerance on the burst control loop. The structure of the individual subframes travelling in either direction is the same, although the inter-subframe assembly methods are different.

In the HDT 1, the switch matrix 17 accepts TDM frames from transceiver 16 and, according to a mapping controlled by the control processor 19, routes the individual time slots in each frame towards the appropriate transceiver 21. Similarly, the switch matrix 17 accepts downstream data from the transceivers 21, subdivides the data into traffic time slots that constitute a particular subframe that is routed to the appropriate ONU. This switch "fabric" also acts as a conduit to connect ONU signalling and control paths to the signalling, control and OAM processors 20, 19, 18.

The signalling processor 20 formats the signals from the ONUs into a standard protocol (e.g., TR-303) to feed the network interfaces 21 (and vice versa), and formats the signalling messages to pass on subscriber-generated and access-generated messages to the core network 23 (and vice versa).

The control processor 19 controls the overall operation of the HDT and subtending ONUS, based on system status inputs and inputs from the OAM processor 18 and signalling processor 20. For instance, the control processor 19 will manage the cross-connection map for the HDT switch matrix 17.

It is noted that a key feature of the prior art system is the transmittal of fully formatted data across the fiber 4, 4a. The ONU 2 is responsible for producing an analog version of an oversampled digital signal based on a received downstream flow of, say, mu-law-encoded voice data. Similarly, the ONU 2 oversamples its subscriber input and formats it for upstream use by the HDT 1. Clearly, the benefit of this technique lies in the bandwidth savings achieved by transmitting fully formatted data across the PON. However, the complexity of such ONUs leads to the previously discussed disadvantages in the areas of cost, size, software download complexity, initial servicing and efficiency.

It would instead be more desirable to place complex processing functions in the HDT 1, by transmitting "raw" (unformatted) data across the PON. This is particularly feasible in today's era of fiber optic bandwidth abundance. Accordingly, the present invention is now described with reference to FIG. 1B, in which an inventive fiber-based access system intended to provide FITL (especially FTTC) comprises an HDT 101 and a plurality of ONUs 102 (only one of which is shown). Each ONU 102 consists of an array of LIUs 103, 127 along with a bidirectional mux 105, an ONU control processor 126, as well as a PON-OS 128 and an optoelectronic transceiver 6. As in the prior art, the mux 105 is of the TDM type, comprising ports that are programmable so as to allot a selectable number of time slots (and hence, bandwidth) to each LIU in both directions of communication.

The mux 105 is connected to an oversampling codec 111 in each LIU 103 by a downstream line 153 and an upstream line 125. Not shown is a control link from the ONU control processor to the codec for controlling its output and sampling rates. The codec 111 preferably comprises complementary one-bit sigma-delta analog-to-digital and digital-to-analog converters, and is connected to a wideband AFE, which interfaces directly with an analog drop line 7 leading to and from a subscriber. Preferably, the link from the fiber at the curb to the subscriber is formed by copper twisted pairs, although coaxial cable may be accommodated by the use of a suitable AFE 8.

Each LIU further comprises a ringing generator 9 and a loop status detector 10, which are connected to each other by line 147, to the AFE 8 by respective lines 145,146 and to the mux by respective lines 133,134. The ringing generator 9 adds a ringing signal to the line under control from signal 133 received from the mux 105, and removes it when the loop status detector 10 determines that the line is in the off-hook position. The loop status detector 10 also provides a digital rendition of the analog line voltage on signal 134 connected to the mux 105. It is to be understood that the ringing generator 9 and loop status detector 10 may be connected directly to the control processor 126 instead of to the mux 105. Moreover, the mux 105 may itself be connected to the ONU control processor 126.

Electrical communication between the mux 105 and the PON-OS 128 can be effected using a bidirectional link 135 or two unidirectional links. The ONU control processor 126 is connected to the PON-OS 128 by a bidirectional signal link 123. The transceiver 6 serves to transform the (multiplexed) electronic data into an optical signal destined for the HDT, and to convert an optical signal from the HDT into electronic data used by the mux 105. The optical signals in both directions preferably originate from, and are combined onto, a single fiber optic cable 4.

Multiple optical fibers come together at a passive optical splitter 30, which in the upstream direction adds the optical energy on each fiber and sends the resultant signal along an umbilical link 4a to the HDT, and in the downstream direction splits the downstream optical signal on the fiber umbilical 4a into a number of identical optical signals a travelling along respective individual fibers 4.

The HDT interfaces with the umbilicals (4a as well as others not shown) by means of respective optoelectronic transceivers 16 connected to a digital switch matrix 117. The switch matrix is a conventional TDM digital switch with traffic data entered into sequential locations in a large data memory at a given fixed frame rate, and the same data read out again in a sequence controlled by a connection memory. The sequencing is controlled via a control link (not shown) by a control processor 119 in the HDT. The control processor 119 is preferably also connected to a loop status processor 113, which performs functions such as decoding a telephone number dialled by the subscriber based on the sampled digital line voltage transmitted from the loop status detector 10 in each LIU 103.

The HDT 101 further comprises a second switch matrix 131, also a conventional TDM digital switch controlled by the control processor 119, which is connected to a plurality of transceivers 21 that interface with the core network (not shown). Also connected to switch matrix 131 are a signalling processor 20 and an OAM processor 118. As in the prior art, the signalling processor 20 formats outgoing data so that it is in the proper signalling format (e.g., TR-303) used by the core network, and vice versa. The OAM processor 118 provides the core network with status information via a link 200; this link also serves to relay instructions for configuring the mux 105 in the ONUs 102. The control processor controls the overall operation of the HDT and subtending ONUs, based on inputs from the OAM processor 118 and the signalling processor 20, as well as system status inputs.

The switch matrices 117, 131 are connected by a bidirectional "hair pin" connection 132 and also through sets of DSPs. The connections are shown in greater detail in FIG. 4B. The first bank of processors consists of a plurality of DSPs 114X, Y, Z that process respective demultiplexed upstream signals 160X, Y, Z and produce respective signals 170X, Y, Z that are routed by switch matrix 131. Decimators 130X, Y, Z respectively intercept the upstream signals 160X, Y, Z so that the associated DSPs are fed fixed-length words of data at a certain speed instead of an oversampled bit stream at a higher rate, as output by the codec in a given LIU.

The second set of processors joining the switch matrices 117, 131 is a plurality of DSPs 114A, B, C which process signals 161A, B, C arriving from switch matrix 131, forming signals 163A, B, C. The DSPs 114A, B, C are connected to respective interpolators 129A, B, C, which create respective high-rate bit streams 164A, B, C that are routed by switch matrix 117.

Each DSP 114X, Y, Z and 114A, B, C is preprogrammed by application and data files stored in respective SAS RAMs 115X, Y, Z and 115A, B, C to execute a conversion algorithm that converts digital data from one format to another. The actual number of DSPs, decimators and interpolators required will depend on total system requirements.

The hair pin connection 132 serves to interconnect the two switch matrices 117, 131, should it be necessary to implement a complex conversion algorithm involving multiple processing steps executed by traversing the DSPs several times in sequence.

From the above, it can be seen that the structure of the inventive system differs from that of the prior art in that the ONUs have been simplified by migrating the DSP functionality to the HDT. As a result, instead of transmitting fully formatted data across the PON, only "raw" (unformatted) data at high bit rates is exchanged between the HDT 101 and ONU 102 (and others not shown) along the fibers 4, 4a. The high data rates required are easily achievable using commonly available optical fibers.

Figure 3A:
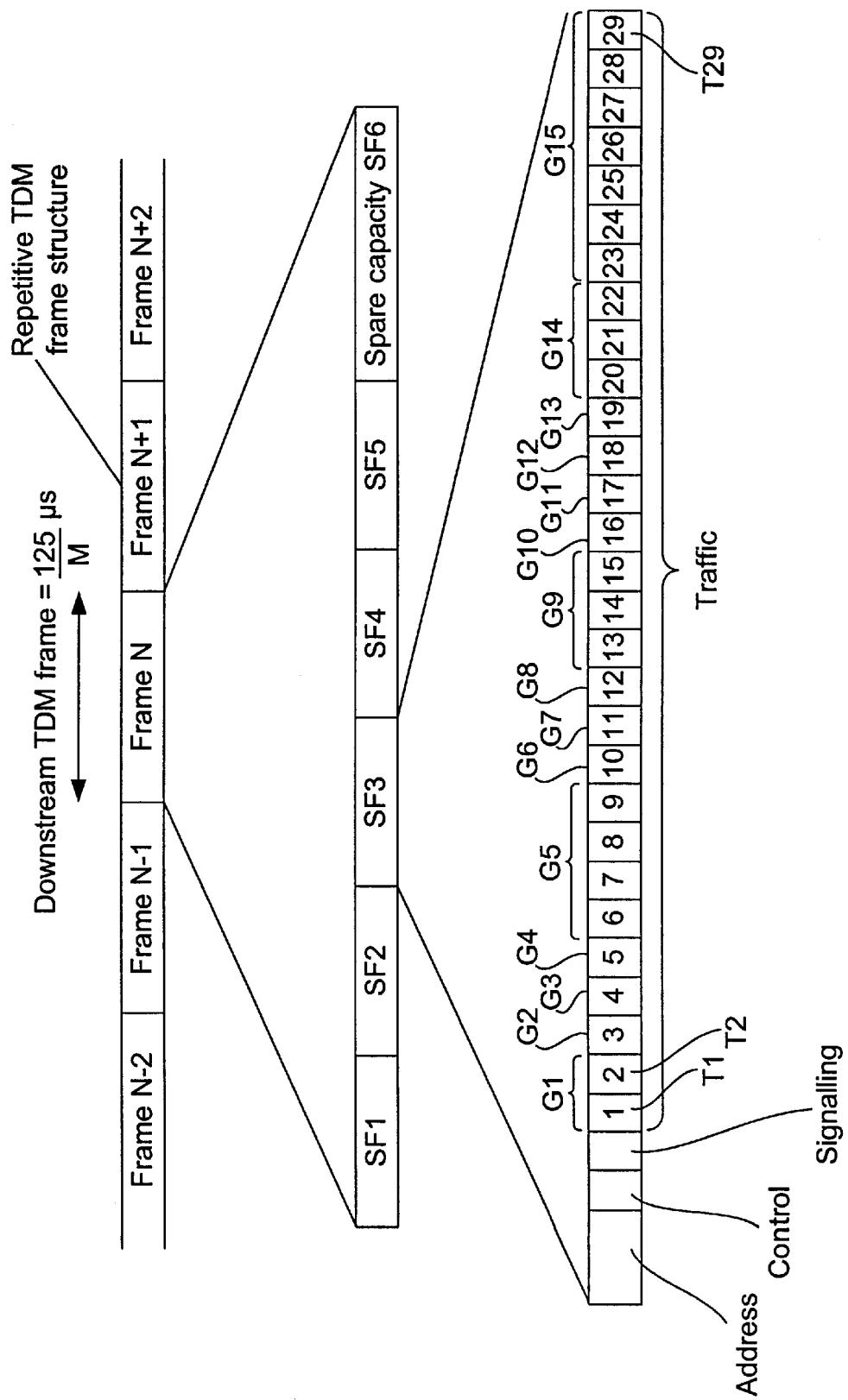
FIG. 3A shows an exemplary data structure on the downstream fiber link of the inventive network of FIG. 1B.

It is helpful to first describe the format of data travelling downstream from the HDT on the fiber 4a with reference to FIG. 3A, which illustrates how a downstream frame F of 125/M $\mu$s (microseconds) is divided into subframes SF1–SF5 destined for respective ONUs. The value of 125 $\mu$s is the standard length of a frame in the public switched telephone network (PSTN) and M is the factor by which this frame length is reduced, usually 1, 8, 12, 16, 24, 25 or 32. As will be shown hereunder, M is used in determining the so-called bandwidth granularity (BG), which is a measure of the resolution in bandwidth deliverable across the PON.

The relative size of a subframe, expressed as the number of BG units required to provide enough transport capacity for the corresponding ONU, may differ from one ONU to another. Considering a particular subframe SF3, it is shown as divided into four fields: an ONU address and synchronization field, a control field, a signalling field and a traffic field. There may also be residual (or spare) bandwidth that is available on the fiber 104 but unexploited by the ONUs, which is shown for the purpose of illustration as occupying a subframe SF6, although in reality the fields of this subframe do not carry useful information.

At the basic physical transport layer the address, control, signalling and traffic fields (or "channels"), are preferably time slots populated with bits and dedicated to transmitting certain classes of information from the HDT to the ONU. The address field in each subframe identifies the ONU for which the traffic is destined. The signalling field preferably carries instructions (such as ringing generator control) to a specific LIU in a known multiplexed format. The control field provides OAM status information and instructions to configure the mux 105, thereby to allocate a certain bandwidth to each LIU according to the service-dependent bandwidth needs for that LIU. The control channel in the downstream subframes also provides control of the codec sampling and output rates in each LIU, as well as precise timing instructions for the transmittal of bursts of upstream data.

The traffic field is divided into a multitude of (in this case, twenty-nine) time slots T1–T29 of "P" bits each. The BG can be defined as the bandwidth offered by the transmission of one time slot per frame, and is dependent on the number of bits per time slot ("P") and on the above-identified frame size reduction factor ("M"). In mathematical terms, BG=(#BITS/TIME SLOT)÷(#SECONDS/FRAME)=P÷(125 μs÷M)=8×P×M kbps.

The number of time slots occupied by an LIU in a subframe is dependent on "M", "P" and the required bandwidth by the LIU. It is useful to set P×M=64 (yielding a BG of 512 kbps) when the oversampled data is required to be sent at data rates that are multiples of 0.5 Mbps. Nonetheless, the bandwidth granularity is an arbitrary but fixed design parameter that can be designed to accommodate a different base multiple of bandwidth used in the system.

The traffic time slots are arranged into a known number (in this case, fifteen) of groups G1–G15, each group providing downstream data to a respective LIU. The number of time slots required per group is selectable and will depend on the bandwidth granularity and on the type of service provided.

These same time slots are used in the analogous construction of upstream subframes transmitted by the ONU 102 to the HDT 101. The mux 105 forms a subframe that is subdivided into groups of time slots, whereby a group is associated with a specific LIU and is allotted a number of time slots that is dependent on the BG and on the required upstream bandwidth. Upon command from the HDT, an ONU transmits its fully constructed upstream subframe on a once-per-frame basis, although the subframes arriving from various ONUs are not contiguous, but instead arrive separated by guard bands.

Figure 1B:
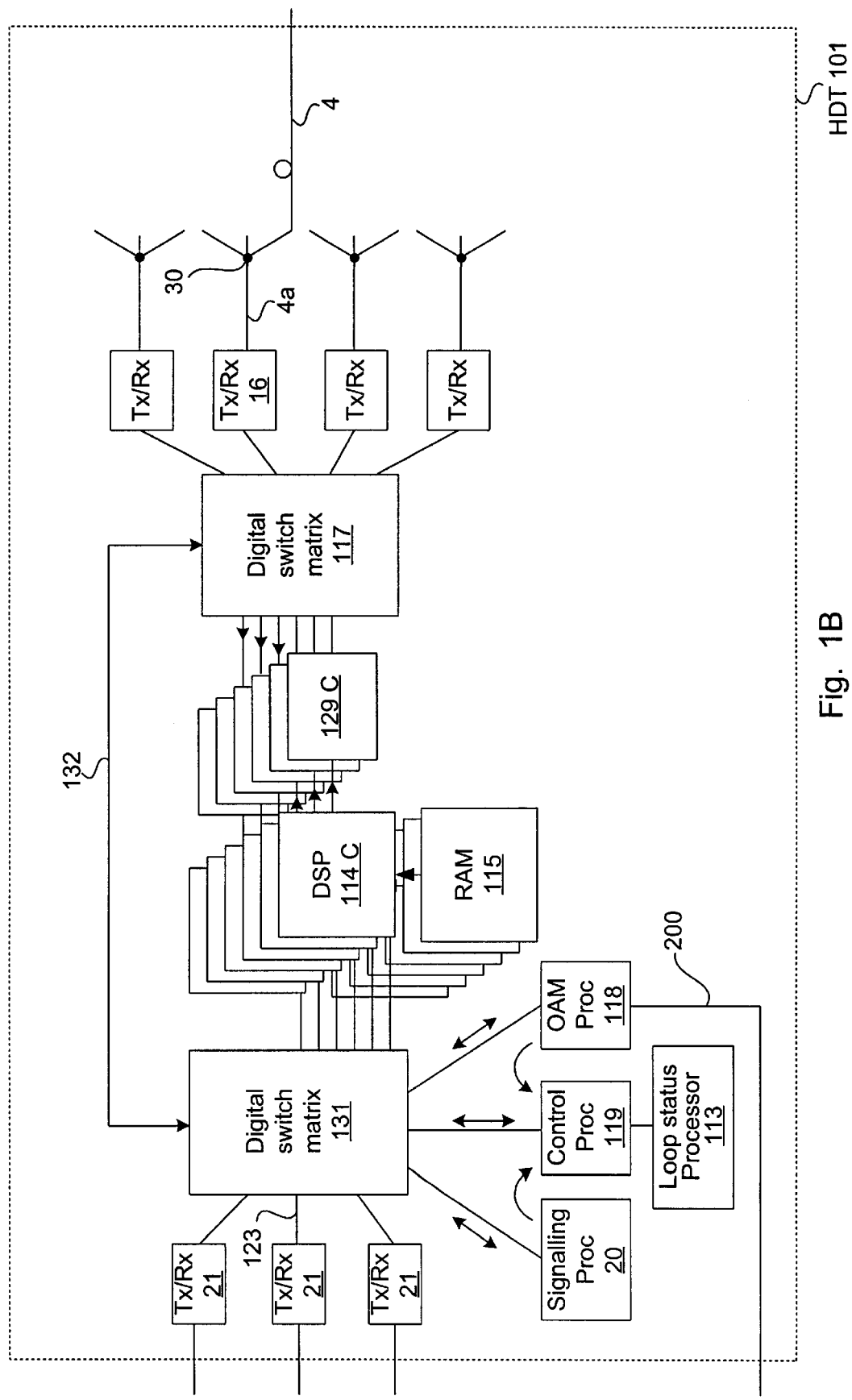
FIG. 1B is a block diagram showing a FITL communications network constructed in accordance with the present invention, including an exemplary inventive HDT and ONU.
Figure 4A:
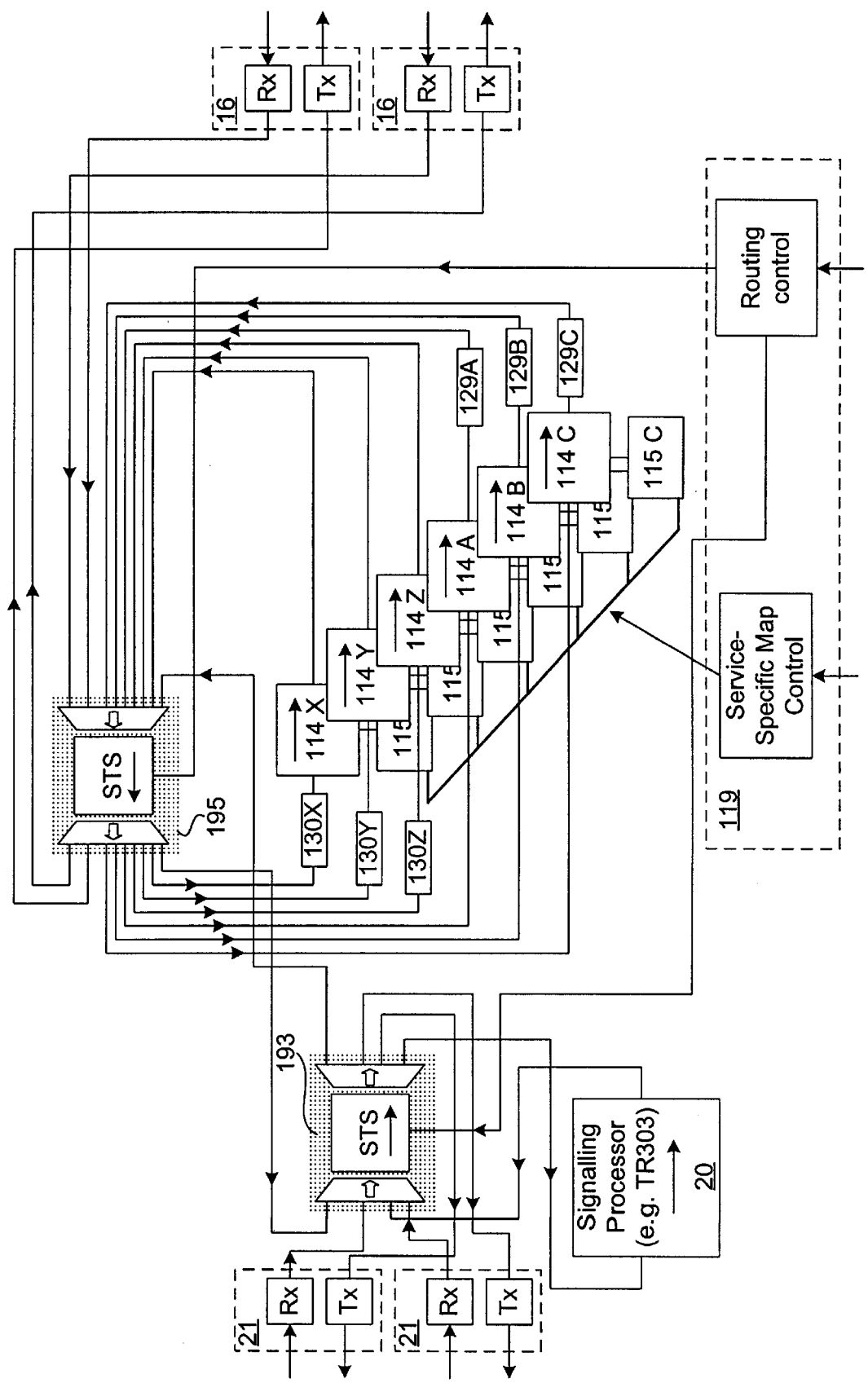
Figure 4B:
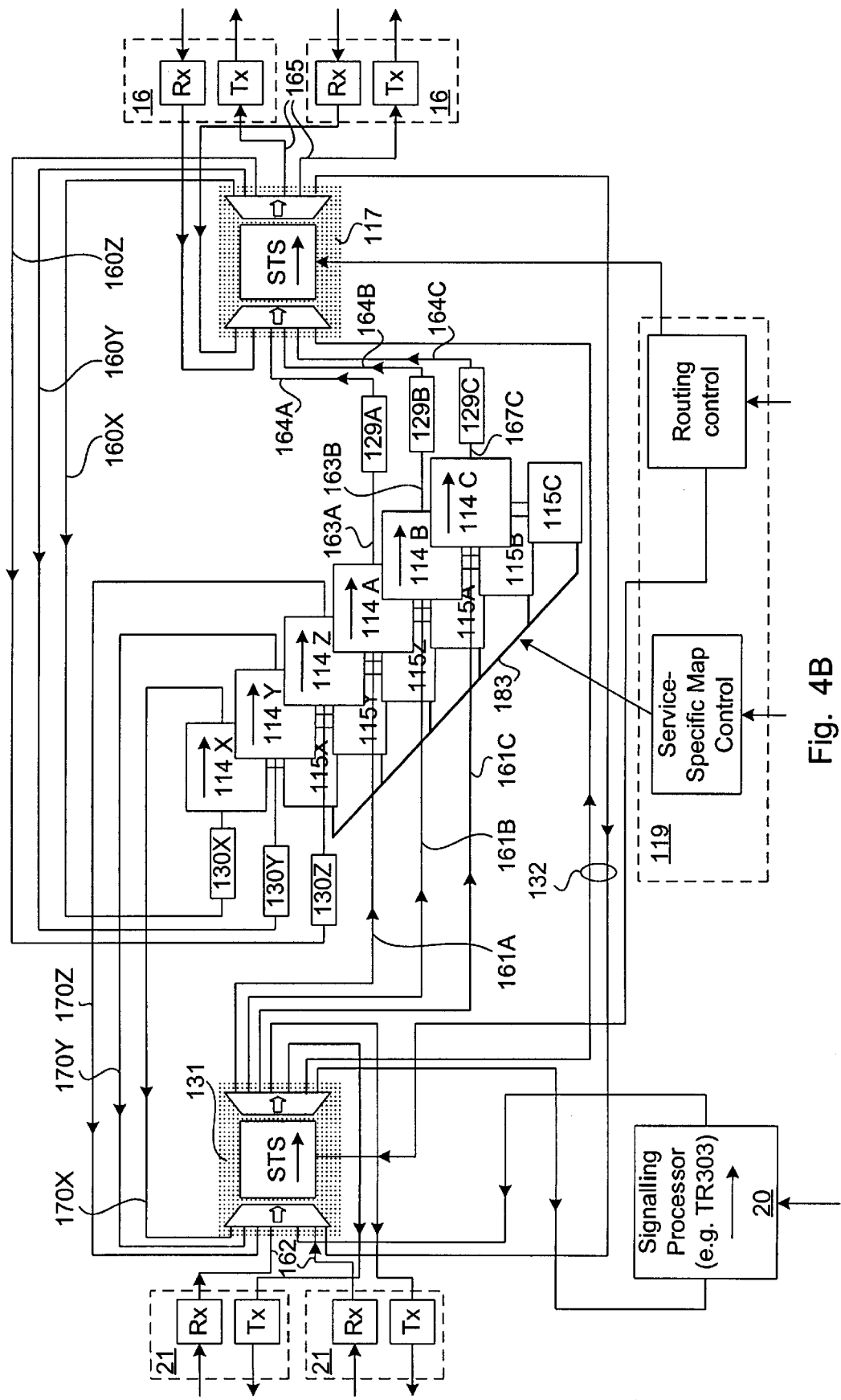

The flow of downstream and upstream data between the core network and a subscriber, passing through the inventive access system, is now considered with reference to FIGS. 1B and 4B. It is particularly useful to contemplate two exemplary scenarios, denoted A and B. Scenario A deals with the situation in which the core network sends and receives multiplexed channels of 8-bit mu-law PCM voice data that are connected through the HDT and ONUs to analog subscriber loops that send and receive analog POTS signals. Scenario B treats the situation in which a Frame Relay (or similar packetized) service carried across an ATM core network is delivered to and from an end user as a Frame Relay service over a DS-1 (1.544 Mbps) twisted pair link.

In downstream scenario A, switch matrix 131 routes the multiplexed channels of 8-bit mu-law encoded voice samples (arriving in a standard network format) to DSP 114A after reformatting is done by the signalling processor 20. DSP 114A is dedicated to producing a stream 163A of, say, 20-bit linearly encoded samples at 32 kHz from the 8-bit mu-law encoded data. In the prior art, this exact same function would be performed by a dedicated DSP within each destination LIU. In contrast, DSP 114A in the present invention processes multiple channels destined for corresponding LIUs, and is thus effectively shared by a number of different LIUs. The data stream 163A passes through interpolator 129A so as to enter switch matrix 117 as a high-rate bit stream 164A, typically on the order of 1 Mbps per channel. This data is in a generic data format, as it simply requires digital-to-analog conversion by the codec in the destination LIU.

Switch matrix 117 also accepts the other high rate data streams 164B, C produced by the respective DSPs 114B, C, and arranges the data into groups, subframes and frames according to destination LIU, ONU and PON in the manner described earlier. The optical downstream signal exiting the HDT, which may have a data rate on the order of several hundred Mbps, is converted to electronic format by the transceiver 6 and subsequently fed to the PON-OS 128.

At the PON-OS 128, the address field in each subframe is checked in order to determine whether the current ONU is the intended recipient of that subframe. Only the subframes intended for that particular ONU are output on link 135 to the mux 105. For each LIU 103, the mux 105 outputs, by a process of demultiplexing, the proper traffic time slots on the link 153 to the codec 111, along with control information for the ringing generator 9 on link 133. In addition, the PON-OS 128 provides control information to the ONU control processor 126 via link 123; alternatively, this information may be delivered from the mux 105.

Within each LIU, the codec 111 then converts the high-rate bit stream on its network-side link 153 into an analog POTS waveform, and the AFE 8 adds appropriate ringing voltages and loop currents. As discussed earlier, the AFE is also responsible for removing the ringing voltage when an off-hook condition is detected, and may interface to a variety of loop termination media, such as copper twisted pair or coaxial cable.

Considering now the upstream path in scenario A, the AFE 8 will prepare the analog POTS signal for sampling by the oversampling codec 111 at around 1 MHz. The oversampled data 152 is fed to the mux 105, where a suitable number of time slots in a subframe are allotted to this stream. Also, the mux 105 will partially fill the control and signalling fields with the status of the analog line received from the loop status detector 10 via path 134. The address field will indicate the source ONU.

Figure 3B:
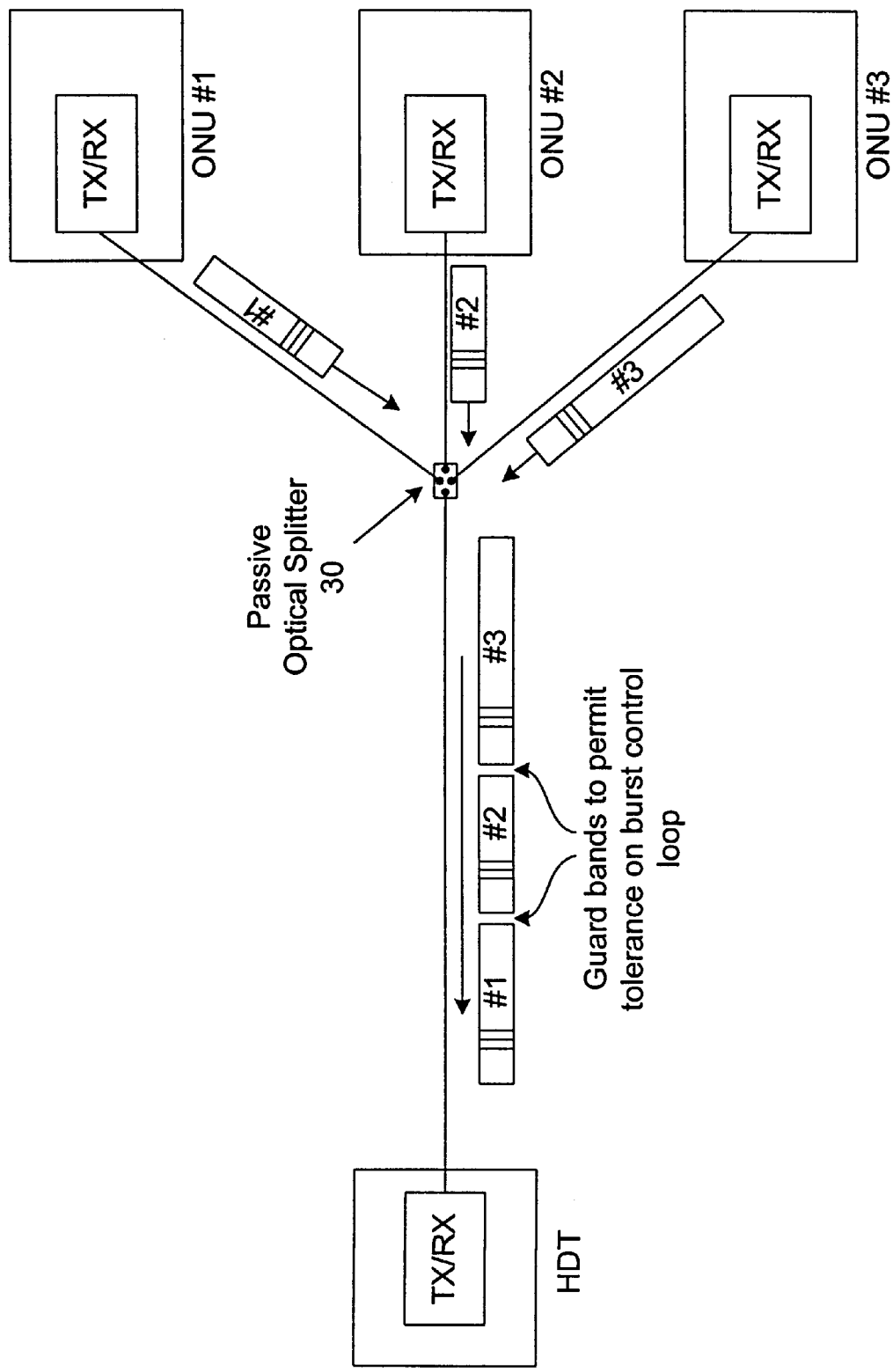
FIG. 3B illustrates upstream data flow on the fiber link of the inventive network of FIG. 1B.

The mux 105 then assembles the time slots from each LIU, as well as all of the information in the remaining fields, forming a subframe, and sends it to the PON-OS 128. The PON-OS waits for the go-ahead from the ONU control processor 126 before sending the subframe onto the fiber 4 via the transceiver 6. The ONU control processor 126 receives this timing information from the HDT in the control field of the downstream subframes. Each ONU sharing the same fiber umbilical 4a is cyclically instructed to send its burst of data, resulting in a "train" 400 of subframes SF1–3 as shown in FIG. 3B. Any consecutive pair of bursts is separated by a short time span 402 of variable length during which no transmission occurs, called a guard band. This is designed to account for the delay in instructing one ONU to transmit while ensuring that the previous ONU has ceased transmission.

The train 400 of data containing the oversampled POTS signal of upstream scenario A arrives at switch matrix 117 of the HDT 101 through transceiver 16. The corresponding traffic time slots are extracted and routed via decimator 130X to a DSP 114X which converts the oversampled decimated data arriving from the subscriber to 8-bit mu-law data. DSP 114X will likely be assigned the task of converting multiple upstream data channels from oversampled decimated format into mu-law format. The output 170X of DSP 114X subsequently passes through switch matrix 131, where it is routed towards its possibly multiple destinations elsewhere in the network via transceivers 21. The signalling processor 20 appropriately formats the outgoing signals prior to optoelectronic conversion by transceivers 21.

In downstream scenario B, ATM cells arriving from the core network and carrying the Frame Relay service are routed by switch matrix 131 to a first DSP 114B. DSP 114B is dedicated to the process of reassembling segments of Frame Relay packets contained in the ATM cell stream into pure Frame Relay packets. This reassembly portion of a so-called segmentation and reassembly (SAR) process is achieved by removing the ATM Gus envelope around the Frame Relay packet segments in the payload of each ATM cell and reassembling those segments into Frame Relay packets.

However, the output 166 of DSP 114B is still not in a suitable format for delivery to the customer (who is expecting to receive line coded 1.544 Mbps DS-1 data). Therefore, the output 163B of DSP 114B is rerouted to the input of another DSP processor 114C by switch matrix 117, hair pin connection 132 and switch matrix 131. DSP 114C is empowered with the insertion of Frame Relay packets into the payload of a 1.544 Mbps DS-1. DSP 114C also formats the digital signal with the required line code, yielding data stream 163C.

Data stream 163C is subsequently passed through an interpolator 129C to yield a very high rate oversampled bit stream 164C, having a data rate on the order of 20 Mbps and requiring, for example, 40 time slots at a bandwidth granularity of 512 kbps per slot. The bit stream 164C is multiplexed by switch matrix 117 and delivered to the appropriate codec 111 of the destination ONU in the manner described above. At the codec 111, the oversampled line coded DS-1 data is converted into an analog waveform, although the data per se is still in digital format, being encoded in the various voltage level durations and changes characteristic to the line code in use.

It is to be noted that bit stream 164C in this downstream scenario B is in the same universal oversampled format as bit stream 164A previously considered in downstream scenario A (although its rate is higher). In fact, the commonness of the data format communicated between the HDT and the ONUs (and vice versa) is an important property of the present invention. The rates, on the other hand, will depend on the service being offered, and the output or sampling rate of the codecs can be controlled via the downstream control channel, as previously discussed.

It is also noteworthy that interpolation is not applied at the output 163B of DSP 114B since this data requires further processing by DSP 114C. This does not imply that an interpolator should be absent at the output of DSP 114B, but rather that all interpolators 129A, B, C be preferably equipped with "bypass mode" functionality (i.e., OUTPUT= INPUT), so that data which is hair pinned several times is interpolated only after having gone through the final DSP prior to delivery to the subscriber.

In upstream scenario B, the digital DS-1 signal sent by the subscriber along the loop 7 undergoes frequency selective loss, accumulates noise and suffers from other impairments as it is propagated along the twisted pair drop. By the time the subscriber-emitted signal reaches the AFE 8, regeneration is required to recover the original digital data from the distorted analog waveform. In the prior art, this regeneration is performed in the LIU proper. In contrast, the codec 111 in the inventive system simply oversamples the data at around 20 MHz as if it were a wideband analog input signal. In other words, the codec 111 "blindly" oversamples the signal and performs no data recovery, leaving the data in the common, high-bandwidth digital format.

The mux 105 inserts the oversampled bit stream into the time slots preassigned to that LIU, subsequently creating a subframe which is sent to the HDT via the PON-OS 128 and transceiver 6 using the upstream burst transmission procedure described above. Clearly, the inventive system trades bandwidth efficiency for simplicity of operation and economy of construction.

At the HDT, oversampled DS-1 data arrives at a transceiver 16, and is subsequently routed to a first DSP 114Y which is programmed to recover the 1.544 Mbps bit stream from the oversampled version of the distorted line coded signal. This known regeneration process is achieved by a combination of frequency equalization, noise filtering and the application of a clocked decision threshold. The output 170Y of DSP 114Y is then routed to the input of a second DSP 114Z via switch matrix 131, hairpin connection 132 and switch matrix 117.

The second DSP 114Z removes the DS-1 header and plainly outputs the payload in the form of Frame Relay packets which had been contained in the original DS-1 stream. The output 170Z of DSP 114Z is once again "hair pinned" back to a third DSP (not shown) which segments the Frame Relay packets into ATM cells by applying the segmentation portion of the SAR process described above. Finally, the ATM data is ready to be sent to its destination through switch matrix 131 and a transceiver 21. Analogous to interpolation in the downstream case, decimation performed in the HDT occurs only once, i.e., at the input to the first DSP in line for processing subscriber-generated data.

Typical oversampling and decimating rates for several common service types are illustrated in the following table:

| Service | Oversampled Bit Rate | Oversampled and Decimated Bit Rate |
| --- | --- | --- |
| POTS | 1–2 Mbps | 32 kHz × 20 bits/word = 640 kbps |
| Foreign Exchange | 1–2 Mbps | 32 kHz × 20 bits/word = 640 kbps |
| ISDN | 2–10 Mbps | 160 kHz × 10 bits/word = 1.6 Mbps |
| DS-1 | 20–40 Mbps | 1.5 MHZ × 10 bits/word = 15 Mbps |

Incidentally, it is also interesting to consider the requirements of the switch matrices 117, 131 in view of the above rates. It is noted that the throughput of a prior art switch matrix 17 would determined by the aggregate fully formatted data capacity to and from all of the PONs connected to that switch matrix, whereas inventive switch matrix 117 is sized to carry the aggregate of all the oversampled data to and from the ONUs in addition to all of the data that is "hair pinned", resulting in the requirement for a much larger data memory when using a standard 125-$\mu$s frame length. However, if the frame length is shortened to match the larger channel bandwidths of the oversampled signals, the memory requirement is reduced since less data arrives per frame. The value of M discussed above can thus be chosen to alleviate the requirements on switch matrix 117 by setting a convenient operating frame rate.

The digital switch matrix 131 has somewhat lesser requirements in that it handles data exiting the DSPs in a finalized format while also handling higher-bandwidth data "hair-pinned" back to the access side switch matrix 117. However, no data need travel through switch matrix 131 in non-decimated form. Switch matrix 131 would thus be chosen as having a frame rate of standard length, i.e., 125 $\mu$s. Alternatively, several switches may be concatenated in the case where a high amount of "hair-pinning" is expected, one switch operating, for example, on a short frame with another one operating on a 125-$\mu$s frame.

It is important to note that relocation of digital signal processing tasks from the ONU to the HDT results in a cheaper, simpler, more efficient and more reliable ONU for deployment deep into the network. On the HDT side, considerable gains in DSP efficiency are also realized. For example, although individual processors are dedicated to a particular task, say conversion of mu-law PCM to linearly encoded samples, a single DSP can be used to perform the task at hand on a number of different data streams. These streams may be destined for completely different ports on the network, such as LIUs on different ONUs in different PONs. Whereas the number of processors required in the prior art was equal to the number of LIUs, the inventive system permits the use of a pool of DSP resources that can be shared across many LIUs. Since not all tasks require the same amount of processing, the HDT need concern itself with total DSP processing power, but not with a particular number of DSPs. Moreover, the DSPs themselves may offer varying degrees of processing ability, and need not be sized to accommodate the worst-case scenario of data conversion, as was formerly the case.

As an illustration of the DSP savings that can be achieved by the present invention, it is worthwhile to consider, for instance, a bank of 16 DSPs each capable of handling either 24 simultaneous mu-law-to-POTS conversions, 6 ISDN-to-POTS conversions or 1 DS-1-to-POTS conversion. If there exists a downstream service requirement for 192 POTS lines, 24 ISDN lines and 2 DS-1 lines, then the following setup of DSPs would be able to accommodate the service mix:

---

8 DSPs × 24 POTS lines/DSP → 192 POTS LIUs serviced
4 DSPs × 6 ISDN lines/DSP → 24 ISDN LIUs serviced
2 DSP × 1 DS-1 lines/DSP → 2 DS-1 LIUs serviced

---

Clearly, a total of 218 LIUs can be accommodated by a mere 16 DSPs sized to handle DS-1-to-POTS conversion. This is minute compared to the 218 DSPs of at least the same power (i.e., not counting combinations of services) that would be required in a prior art approach based on service-independent line cards.

Notwithstanding the benefits of the inventive system given the artificial service mix assumed above, the following more detailed analysis of realistic loading conditions will reveal that in a typical service mix, the usage of a shared set of DSP blocks indeed allows each DSP to be more optimally loaded. For instance, if a DSP is capable of processing "m" lines of service type A, "n" lines of service type B and "p" lines of service type C, then, on a system with a total need to service "w" LIUs, the total DSP count for full service across the entire system is w/m+w/n+w/p. In other words, with DSPs in the HDT that are dedicated to a particular type of processing, one must stock up enough DSPs to cover any and all of the three worst cases. Clearly, DSP savings are achieved when (w/m+w/n+w/p)<w, or (1/m+1/n+1/p)<1.

Depending on the processing power of the DSPs in the HDT, this may require fewer resources than the prior art.

However, the advantages of centralizing the DSP resources become indisputable in the event that more than 3 lines of service on average (i.e., across all service types) can be processed in a DSP. Then m, n and p are all greater than 3 and the above inequality is satisfied, resulting in DSP savings due to "centralization" of DSP resources. Typical numbers for modern DSPs processing POTS, ISDN and DS-1 are even more encouraging, and are on the order of 24 POTS/DSP, 6 ISDN/DSP, 2.5 DS-l/DSP, yielding (1/m+1/n+1/p)=0.6083.

The analysis may be extended one step further by applying known practical traffic mix requirement limits into the process of dimensioning the DSPs. For instance, if only a certain maximum percentage (e.g., 10%) of lines will ever need DS-1 service and another maximum percentage of lines (e.g., 25%) will ever need ISDN service at one time (without knowing which lines are occupied by what service), then the above inequality becomes $\frac{1}{24}$*100% (POTS could be used 100% of the time)

+$\frac{1}{6}$*25% (ISDN is used at most 25% of the time)

+$\frac{1}{2.5}$*10% (DS-1 is used at most 10% of the time)

----------

0.1233<1 for almost an order of magnitude savings (8.11:1) in the number of DSPs required.

On top of the added capacity, a further advantage of the present invention is that the DSPs are found in a centralized environment, which reduces the cost of provisioning and dimensioning the DSPs to meet future traffic demands. Moreover, the DSPs are flexible and their respective RAMs are reprogrammable by the control processor 119, either through a control bus 183 as illustrated in FIG. 4B or through one of the switch matrices 117, 131, thereby providing the ability to track the evolving demands of the network.

The control processor 119 in the HDT can also play a vital role in reducing the bandwidth taken up by the various LIUs, particularly in the case of ISDN and DS-1 services. For instance, an on-hook (unused) POTS line takes up very little a bandwidth, as does an unused DS-1 video conference line (i.e., the far end modem at the customer premises is in a quiescent mode), since the only requirement on that DS-1 loop is to detect the start up of the DS-1 Customer Premises Equipment. The control processor 119 can thus lower the sampling and output rates of the oversampling codecs and decimators on LIUs which are in an on-hook or quiescent condition to values much below that which the LIUs would require for an active delivery of POTS or DS-1 services.

Hence, assuming a service mix of 80% POTS at 640 kbps, 10% ISDN at 1.6 Mbps, and 10% DS-1 at 15 Mbps (all data rates are oversampled and decimated), and further assuming an average off-hook (in use) duty cycle of 25% along with 80% bandwidth reduction during on-hook (out of use) periods for both POTS and DS-1, then the average bandwidth per loop would be on the order of:

---

[(640 kbps * 25%) + (0,2 * 640 kbps * 75%)]  * 80%
+ [(1.6 Mbps * 100%)]                                                    * 10%
+ [(15 Mbps * 25%) + (0.2 * 15 Mbps * 75%)]   * 10%

= 964.8 kbps per loop

---

This would allow up to 621 subscribers to be accessed with a single 600-Mbps PON, corresponding to the installation of up to sixteen 38-line ONUs or eight 77-line ONUs. A single fiber umbilical can thus serve a distribution area with over 600 customers, which is the norm for current North American telecommunications company serving areas.

The preceding example has assumed that decimated data are transmitted across the PON. This is achieved by an alternate embodiment of the present invention, in which the decimation and inverse functions are kept in the LIUs. Thus, considering the upstream path, a decimator would be placed between the codec 111 and the mux 105 instead of in the HDT. Optionally, decimators could be placed in both locations, whereby each upstream signal path would comprise one fully functional decimator and another operating in bypass mode. Clearly, analogous arrangements apply to the interpolators in the downstream path.

In another variant of the present invention, the functionality of the loop status processor 113 would be placed in each LIU 103, 127. Specifically, the loop status detector 10 may feed its signal 134 directly to the ONU control processor 126 or to an intermediate loop status processing block. The ONU control processor would perform the control functions of determining the condition of the line or decoding the dialled digits, relaying this information to the HDT via the upstream control channel. Similarly, the ringing generator 9 may be controlled from the ONU control processor 126, thus further liberating the mux 105, which is left with the task of simply routing the data to and from the LIUs.

It is also to be understood that many alternate embodiments of the present invention exist in which the processing chain in the HDT is configured differently than in FIG. 4B. Such is the case in FIG. 4A, wherein a single high-capacity switch matrix 195 replaces the switch matrices 117, 131 of FIG. 4B. In this case, hair pinning does not require a link external to the switch matrix. Instead, data both from the ONUs and from the core network are continuously routed to the DSP bank and back through the switch matrix 195 until the required number of processing operations have been performed.

There may also be a 125-μs framed switch matrix 193 present at the core network side connected to the signalling processor which provides grooming of the frames leaving or entering the HDT at a 125 μs frame rate. In all other respects, the HDT is identical to that of FIG. 4B.

Yet another example of an inventive HDT partitions the short-frame switch matrices of FIG. 4B into two, resulting in four STS switches 117U, 117D, 131U, 131D as shown in FIG. 4C. In this case, two hair pin connections 132U, 132D are required, one for each direction travelled by the data. The signalling processor 20 now provides independent grooming of the frames in both the downstream and upstream paths. However, there is no fundamental difference in operation of the embodiment illustrated in FIG. 4C with respect to what has already been described with reference to FIG. 4B.

Numerous other modifications and variations of the present invention are possible in light of the above teachings. It is therefore to be understood that within the scope of the appended claims, the invention may be practised otherwise than as specifically described herein.

We claim:

1. A fiber optic communication system comprising:

a host digital terminal (HDT) for connection to a core communications network; and at least one optical network unit (ONU) for interfacing to a corresponding plurality of subscriber loops and connected by optical fiber to the HDT;

wherein, for each subscriber loop communicating with the core network, said subscriber loop transmits analog or digital data to its corresponding ONU (and vice versa) in a corresponding one of a plurality of analog formats; said corresponding ONU transmits digital data to the HDT (and vice versa) in a common, high-bandwidth digital format; and the HDT transmits digital data to the core network (and vice versa) in a corresponding one of a plurality of digital formats;

wherein the HDT executes digital signal processing functions for converting data from any of the plurality of digital formats to the common digital format (and vice versa).

2. The system of claim 1, wherein the at least one ONU comprises a plurality of substantially identical line interface units (LIUs) for respectively interfacing to the corresponding subscriber loops, wherein the HDT comprises a digital switch matrix, a plurality of programmable digital signal processors (DSPs) connected to the digital switch matrix for executing the signal processing functions, and means to control the digital switch matrix so as to select, for each LIU, at least one first signal processing function to be executed by a first subset of the plurality of DSPs on data arriving from the core network and destined for the LIU, and at least one second signal processing function to be executed by a second subset of the plurality of DSPs on data arriving from the LIU and destined for the core network.

3. The system of claim 2, wherein the at least one ONU further comprises an optical transceiver connected to the optical fiber and a bidirectional multiplexer connected between the optical transceiver and the plurality of LIUs, each LIU having an oversampling codec, and wherein the HDT further comprises at least one first optical transceiver connected between the optical fiber and the switch matrix and at least one second optical transceiver for connection to the core network and connected to the switch matrix.

4. A system according to claim 3, wherein the HDT further comprises a plurality of interpolators placed at the respective outputs of the first subset of DSPs for increasing the rate of data destined for the LIUs of the at least one ONU, and a plurality of decimators placed at the respective inputs of the second set of DSPs for reducing the rate of data arriving from the LIUs of the at least one ONU.

5. A system according to claim 3, wherein at least one LIU further comprises a decimator and an interpolator placed between the codec and the multiplexer, wherein the decimator decreases the rate of data flowing to the multiplexer and the interpolator increases the rate of data flowing to the codec.

6. A system according to claim 3, wherein the HDT further comprises a plurality of random access memories (RAMs) that store programs run by respective DSPs.

7. A system according to claim 6, wherein the HDT further comprises a control processor for controlling the switch matrix, thereby to selectively interconnect the at least one first and second transceiver to the plurality of DSPs.

8. A system according to claim 7, wherein the control processor is connected to the RAMs and can change the respective programs, thereby to change the signal processing functions executed by the associated DSPs.

9. A system according to claim 3, wherein the HDT further comprises a loop status processor for monitoring voltage and current conditions on each of the plurality of subscriber loops.

10. A system according to claim 3, wherein the HDT further comprises an OAM processor for controlling the operation of the multiplexer in the at least one ONU.

11. A system according to claim 3, wherein the switch matrix comprises a first digital switch connected between the at least one first transceiver and the DSPs, and a second digital switch connected between the DSPs and the at least one second transceiver.

12. A system according to claim 11, wherein the first and second digital switches are connected by a bidirectional hair pin connection, whereby data output by the first digital switch may be routed to the second digital switch and data output by the second digital switch may be routed to the first digital switch, thereby to traverse the DSPs a plurality of times in sequence.

13. A system according to claim 3, wherein the at least one ONU further comprises an ONU control processor connected between the transceiver and the multiplexer for interpreting control instructions received from the HDT and for sending status information to the HDT.

14. A system according to claim 13, wherein each LIU further comprises a ringing generator, a loop status detector and an analog front end for generating and interpreting currents and voltages on the associated subscriber loop.

15. A system according to claim 14, wherein the ringing generator and loop status detector on each LIU are connected to the multiplexer of the corresponding ONU.

16. A system according to claim 14, wherein the ringing generator and loop status detector on each LIU are connected to the ONU control processor of the corresponding ONU.

17. A system according to claim 14, wherein the analog front end on each LIU interfaces to a copper twisted pair subscriber loop.

18. A system according to claim 14, wherein the analog front end on each LIU interfaces to a coaxial cable subscriber loop.

19. A system according to claim 3, wherein the HDT and at least one ONU are interconnected in a passive optical network configuration.

20. A system according to claim 3, wherein the HDT and at least one ONU are interconnected in a SONET ring configuration.

21. A system according to claim 3, wherein the HDT and at least one ONU are interconnected by point-to-point link.

22. A system according to claim 3, wherein one of the signal processing functions consists of converting mu-law encoded pulse code modulation (PCM) data samples arriving from the core network into linearly encoded data samples destined for at least one LIU in the at least one ONU.

23. A system according to claim 3, wherein one of the signal processing functions consists of converting linearly encoded data samples arriving from at least one LIU in the at least one ONU into mu-law encoded pulse code modulation (PCM) data samples destined for the core network.

24. A system according to claim 22, wherein another of the signal processing functions consists of converting linearly encoded data samples arriving from at least one LIU in the at least one ONU into mu-law encoded PCM data samples destined for the core network.

25. A system according to claim 3, wherein one of the signal processing functions consists of reassembling a Frame Relay data packet from segments of the Frame Relay data packet contained in the payload of respective ATM cells.

26. A system according to claim 3, wherein one of the signal processing functions consists of constructing a line coded DS-1 data stream from a Frame Relay data packet.

27. A system according to claim 3, wherein one of the signal processing functions consists of regenerating a DS-1 digital signal from an oversampled distorted line coded DS-1 signal.

28. A system according to claim 3, wherein one of the signal processing functions consists of extracting a Frame Relay packet from a the payload of a DS-1 data digital signal.

29. A system according to claim 3, wherein one of the signal processing functions consists of segmenting a Frame Relay data packet and inserting the segments into the payload of respective ATM cells.

30. In a fiber optic communication system comprising a host digital terminal (HDT) for connection to a core communications network and at least one optical network unit (ONU) for interfacing to a corresponding plurality of subscriber loops and connected by optical fiber to the HDT; wherein the HDT comprises a digital switch matrix and a plurality of programmable digital signal processors (DSPs) executing respective processing functions and connected to the digital switch matrix, a method of communicating data between the HDT and the at least one ONU, comprising:

in a downstream direction, the switch matrix routing data received by the HDT from the core network in any of a plurality of distinct digital formats to selected ones of the DSPs; the DSPs performing respective processing functions, yielding downstream data in a common, high-bandwidth digital format; the switch matrix routing the downstream data to the at least one ONU; and in an upstream direction, the switch matrix routing data received from the at least one ONU in said common, high-bandwidth digital format to selected ones of the DSPs; the DSPs performing respective processing functions, yielding upstream data in at least one of said plurality of distinct digital formats; the switch matrix routing the upstream data to the core network.

31. A method according to claim 30, further comprising in the downstream direction, the switch matrix routing the downstream data back to the DSPs at least once prior to routing it to the at least one ONU; and in the upstream direction, the switch matrix routing the upstream data back to the DSPs at least once prior to routing it to the core network.

32. A method according to claim 30, further comprising in the downstream direction, the downstream data being interpolated prior to being routed to the at least one ONU; and in the upstream direction, the data received from the at least one ONU being decimated prior to being processed by the DSPs.

33. A method according to claim 30, wherein the data being sent to the at least one ONU is organized into frames, wherein each frame comprises a number of downstream subframes, wherein each downstream subframe within a frame is destined for a particular ONU and comprises a traffic field sectioned into groups of time slots, wherein each group of time slots is destined for a separate line interface unit (LIU) in said ONU, wherein each LIU provides data in a specific format to a respective subscriber, the number of time slots in a group being dependent on the specific data format provided by the associated LIU.

34. A met hod according to claim 33, wherein the data being sent by the at least one ONU is organized into upstream subframes comprising a traffic field sectioned into groups of time slots, wherein each group of time slots originates from a separate LIU in the ONU, the number of slots in a group being dependent on the specific data format provided by the associated LIU.

35. A method according to claim 33, wherein each downstream subframe further comprises a control field containing instructions for configuring a multiplexer on the ONU for which said downstream subframe is destined.

36. A method according to claim 34, wherein each downstream subframe further comprises a control field containing instructions for timing the transmission of upstream subframes by the ONU for which said downstream subframe is destined.

37. A method according to claim 33, wherein each downstream subframe further comprises an address field for identifying the ONU for which said downstream subframe is destined.

38. A method according to claim 34, wherein each upstream subframe further comprises an address field for identifying the ONU from which said upstream subframe originates.

39. A method according to claim 34, wherein pairs of upstream subframes transmitted by the at least one ONU are separated by a guard band of variable length.

40. A method according to claim 30, wherein the data received from and transmitted to the core network by the HDT is formatted by a signalling processor in the HDT.

41. A host digital terminal (HDT) for enabling bidirectional communication between a core network and at least one optical network unit (ONU) having a plurality of line interface units (LIUs), the HDT comprising:

a digital switch matrix, a plurality of programmable digital signal processors (DSPs) connected to the digital switch matrix for executing the signal processing functions;

at least on first optical transceiver connected between the optical fiber and the switch matrix;

at least one second optical transceiver for connection to the core network and connected to the switch matrix; and means to control the digital switch matrix so as to select, for each LIU, at least one first signal processing function to be executed by a first subset of the plurality of DSPs on data arriving from the core network through the at least one second optical transceiver and destined for the LIU, and at least one second signal processing function to be executed by a second subset of the plurality of DSPs on data arriving from the LIU through the at least one first optical transceiver and destined for the core network.

42. An HDT according to claim 41, further comprising a plurality of interpolators placed at the respective outputs of the first subset of DSPs for increasing the rate of data destined for the LIUs of the at least one ONU, and a plurality of decimators placed at the respective inputs of the second set of DSPs for reducing the rate of data arriving from the LIUs of the at least one ONU.

43. An HDT according to claim 41, further comprising a plurality of random access memories (RAMs) that store programs run by respective DSPs.

44. An HDT according to claim 43, further comprising a control processor for controlling the switch matrix, thereby to selectively interconnect the at least one first and second transceiver to the plurality of DSPs.

45. An HDT according to claim 44, wherein the control processor is connected to the RAMs and can change the respective programs, thereby to change the signal processing functions executed by the associated DSPs.

46. An HDT according to claim 41, further comprising a loop status processor for monitoring voltage and current conditions on the subscriber loops.

47. An HDT according to claim 41, further comprising an OAM processor for controlling the operation of the at least one ONU.

48. An HDT according to claim 41, wherein the switch matrix comprises a first digital switch connected between the at least one first transceiver and the DSPs, and a second digital switch connected between the DSPs and the at least one second transceiver.

49. An HDT according to claim 48, wherein the first and second digital switches are connected by a bidirectional hair pin connection, whereby data output by the first digital switch is routed to the second digital switch and data output by the second digital switch is routed to the first digital switch.

50. An HDT according to claim 41, wherein one of the signal processing functions consists of converting mu-law encoded pulse code modulation (PCM) data samples arriving from the core network into linearly encoded data samples destined for at least one LIU in the at least one ONU.

51. An HDT according to claim 41, wherein one of the signal processing functions consists of converting linearly encoded data samples arriving from at least one LIU in the at least one ONU into mu-law encoded pulse code modulation (PCM) data samples destined for the core network.

52. An HDT according to claim 50, wherein another of the signal processing functions consists of converting linearly encoded data samples arriving from at least one LIU in the at least one ONU into mu-law encoded PCM data samples destined for the core network.

53. An HDT according to claim 41, wherein one of the signal processing functions consists of reassembling a Frame Relay data packet from segments of the Frame Relay data packet contained in the payload of respective ATM cells.

54. An HDT according to claim 41, wherein one of the signal processing functions consists of constructing a line coded DS-1 data stream from a Frame Relay data packet.

55. An HDT according to claim 41, wherein one of the signal processing functions consists of regenerating a DS-1 digital signal from an oversampled distorted line coded DS-1 signal.

56. An HDT according to claim 41, wherein one of the signal processing functions consists of extracting a Frame Relay packet from a the payload of a DS-1 data digital signal.

57. An HDT according to claim 41, wherein one of the signal processing functions consists of segmenting a Frame Relay data packet and inserting the segments into the payload of respective ATM cells.

* * * * *